(12) United States Patent
Komuro

(10) Patent No.: US 7,682,729 B2
(45) Date of Patent: Mar. 23, 2010

(54) PACKAGE STRUCTURE OF ELECTRIC STORAGE CELLS

(75) Inventor: Masaki Komuro, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 385 days.

(21) Appl. No.: 11/719,784

(22) PCT Filed: Nov. 24, 2005

(86) PCT No.: PCT/JP2005/021569
§ 371 (c)(1),
(2), (4) Date: May 21, 2007

(87) PCT Pub. No.: WO2006/057291
PCT Pub. Date: Jun. 1, 2006

(65) Prior Publication Data
US 2009/0226804 A1 Sep. 10, 2009

(30) Foreign Application Priority Data
Nov. 25, 2004 (JP) .............................. 2004-341249

(51) Int. Cl.
*H01M 6/00* (2006.01)
*H01M 10/00* (2006.01)
*H01M 6/42* (2006.01)
*H01M 6/46* (2006.01)

(52) U.S. Cl. ....................... 429/122; 429/149; 429/152; 429/153

(58) Field of Classification Search ............... 429/34, 429/35, 36, 37, 96, 97, 98, 99, 100, 149, 429/150, 151, 152, 153, 154, 155, 156, 157, 429/158, 159, 160, 163, 164, 175, 176, 177, 429/178, 179
See application file for complete search history.

(56) References Cited

U.S. PATENT DOCUMENTS
2003/0203278 A1* 10/2003 Hamada et al. ............. 429/156

FOREIGN PATENT DOCUMENTS
| JP | 11-111250 A | 4/1999 |
| JP | 2001076697 A * | 3/2001 |
| JP | 2003-157813 A | 5/2003 |
| JP | 2003-272588 A | 9/2003 |
| JP | 2003-323879 A | 11/2003 |

* cited by examiner

*Primary Examiner*—Jerry Lorengo
*Assistant Examiner*—Eli Mekhlin
(74) *Attorney, Agent, or Firm*—Darby & Darby

(57) ABSTRACT

A cell binder includes a frame body and a frame body. A storage portion of a electric storage cell are pressed/clamped by the bottom of an accommodating portion of the frame body and the bottom of an accommodating portion of the frame body. Also, a sealing portion of the electric storage cell is accommodated in a gap between the bottom of a fitting concave portion of the frame body 16 and the front end of a projecting portion of the other frame body, in a state of being deflected by bending, and the sealing portion is clamped between an inner wall of the fitting concave portion and an outer wall of the projecting portion, thereby fitting the frame bodies to each other. This makes it possible to reduce the size for clamping the sealing portion and to achieve the downsizing of the entire package. In addition, providing the sealing portion with deflections allows movements of the electric storage cell to be accommodated when vibrations are applied. This eliminates a possibility that the sealing portion will be damaged by a shearing stress, and leads to durability to be improved.

5 Claims, 5 Drawing Sheets

PACKAGE STRUCTURE OF ELECTRIC STORAGE CELLS

CROSS-REFERENCE TO PRIOR APPLICATIONS

This is a U.S. national phase application under 35 U.S.C. § 371 of International Patent Application No. PCT/JP2005/021569 filed Nov. 24, 2005 and claims the benefit of Japanese Application No. 2004-341249 filed Nov. 25, 2004. The International Application was published in Japanese on Jun. 1, 2006 as International Publication No. WO/2006/057291 A1 under PCT Article 21(2), the content of both applications are incorporated herein in their entirety.

TECHNICAL FIELD

The present invention relates to a package structure of electric storage cells, the package structure increasing the shock resistance of the electric storage cells while downsizing the package.

BACKGROUND ART

In recent years, flat electric storage cells having a substantially rectangular planar shape, such as a lithium ion secondary battery or an electric double layer capacitor, have been put to practical use, and are regarded as promising as a power source for various equipment because of their high energy density, miniaturizability, easy maintenance, and the like.

Such planar electric storage cells are often used as an assembled cell that is packaged by laminating a plurality of the electric storage cells. When the electric storage cells are installed on a hybrid electric vehicle, an electric vehicle, or the like as a power source, it is necessary to ensure their durability to withstand vibrations.

For example, Japanese Unexamined Patent Application Publication No. 2003-157813 discloses a technique for increasing the vibration-isolation effect of an assembled cell by preventing an external case that is a support member for unit cells from reaching a resonance point in a real usage region, by shifting a natural frequency of the assembled cell to the higher frequency side.

When the planar electric storage cells are packaged, there is a case where individual electric storage cells are each accommodated in a frame body, and a plurality of the frame bodies each having accommodated the electric storage cell is constituted as an assembled cell. In this case, in accommodating the planar cell into the frame body, it is possible to adopt, for example, a structure wherein one frame body is divided into two members, and after the two members have been opposed to each other, a storage portion of the electric storage cell and a sealing portion are clamped by pressing them planarly.

However, in such a structure in which all electric storage cells are planarly fixed, the size of the package increases by a space for fixing the sealing portion, and in addition, there is a possibility that the storage portion with a relatively large weight and the sealing portion with a relatively light weight will move at mutually different frequencies or amplitudes from each other, so that a stress might concentrate on the boundary portion between the storage portion and the sealing portion, resulting in a reduced durability. In particular, when the thickness of the storage portion and that of the sealing portion vary due to dimension deviations among individual electric storage cells, it is impossible to clamp the storage portion and the sealing portion by simultaneously pressing them, leading to a reduction in shock resistance.

The present invention has been made in view of the above-described circumstances. The object of the present invention is to provide a package structure of electric storage cells, the package structure being capable of increasing the shock resistance of the electric storage cells while downsizing the package.

SUMMARY OF INVENTION

To solve the above-described object, the present invention provides a package structure of electric storage cells, the package structure being packaged by accommodating the planar-shaped electric storage cells each of which has a storage portion and a sealing portion that seals the storage portion extendedly arranged around the storage portion in frame bodies, the package structure including a first frame body for pressing the storage portion from one surface side thereof; a second frame body opposed to the first frame body for pressing the storage portion from the other surface side thereof; and a holding structure is provided in the first frame body and the second frame body, the holding structure being for accommodating the sealing portion in a deflected state and being fit in the pressing direction of the storage portion in a state where the ends of the sealing portion are clamped. Here, the holding structure can be constituted by a gap for accommodating the sealing portion in a bent state, and wall surface portions being fit in the pressing direction of the storage portion in a state where the ends of the sealing portion are clamped.

DETAILED DESCRIPTION OF THE INVENTION

Figure 1:
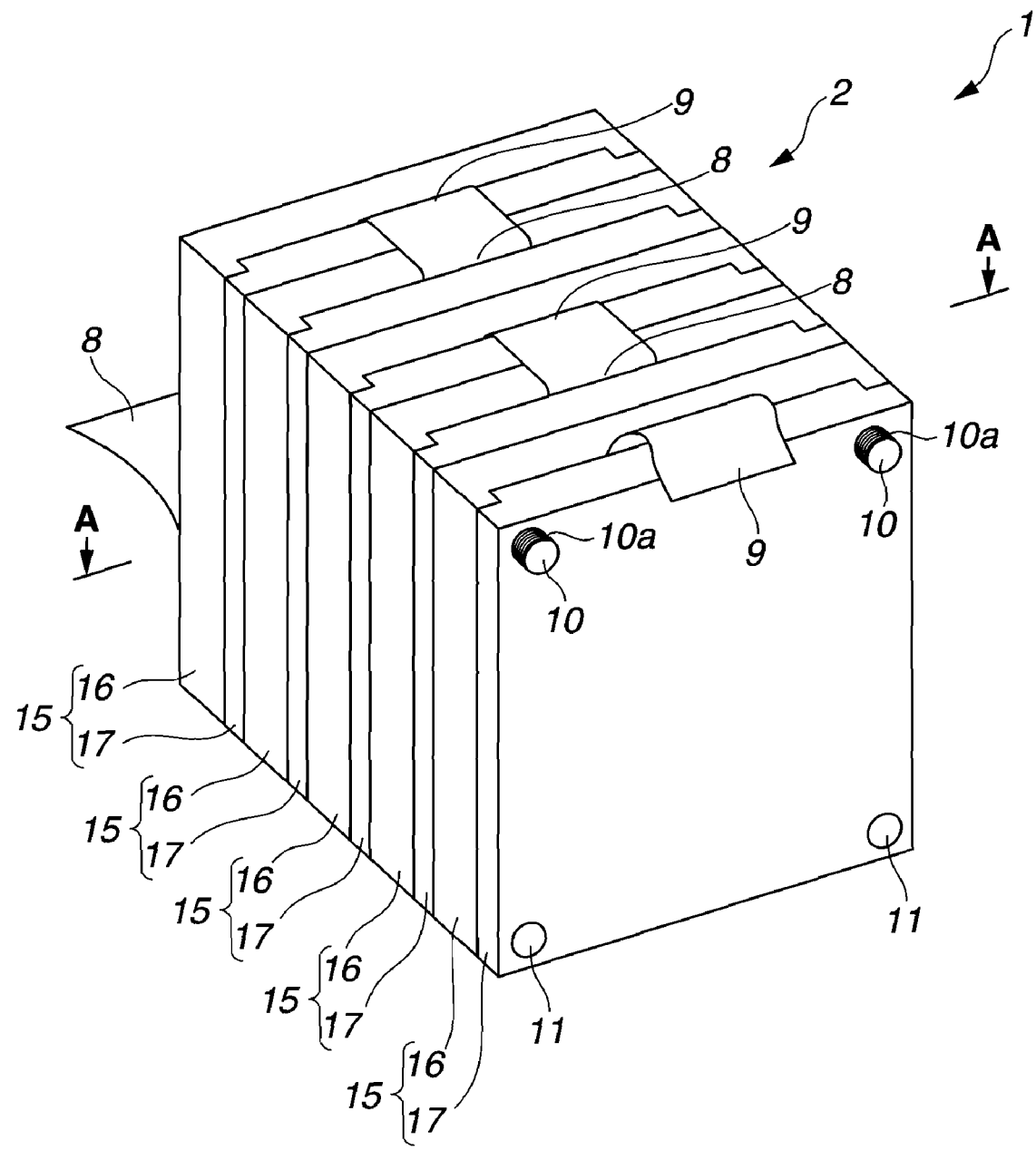
FIG. 1 is a perspective view of a storage capacitor package.
Figure 2:
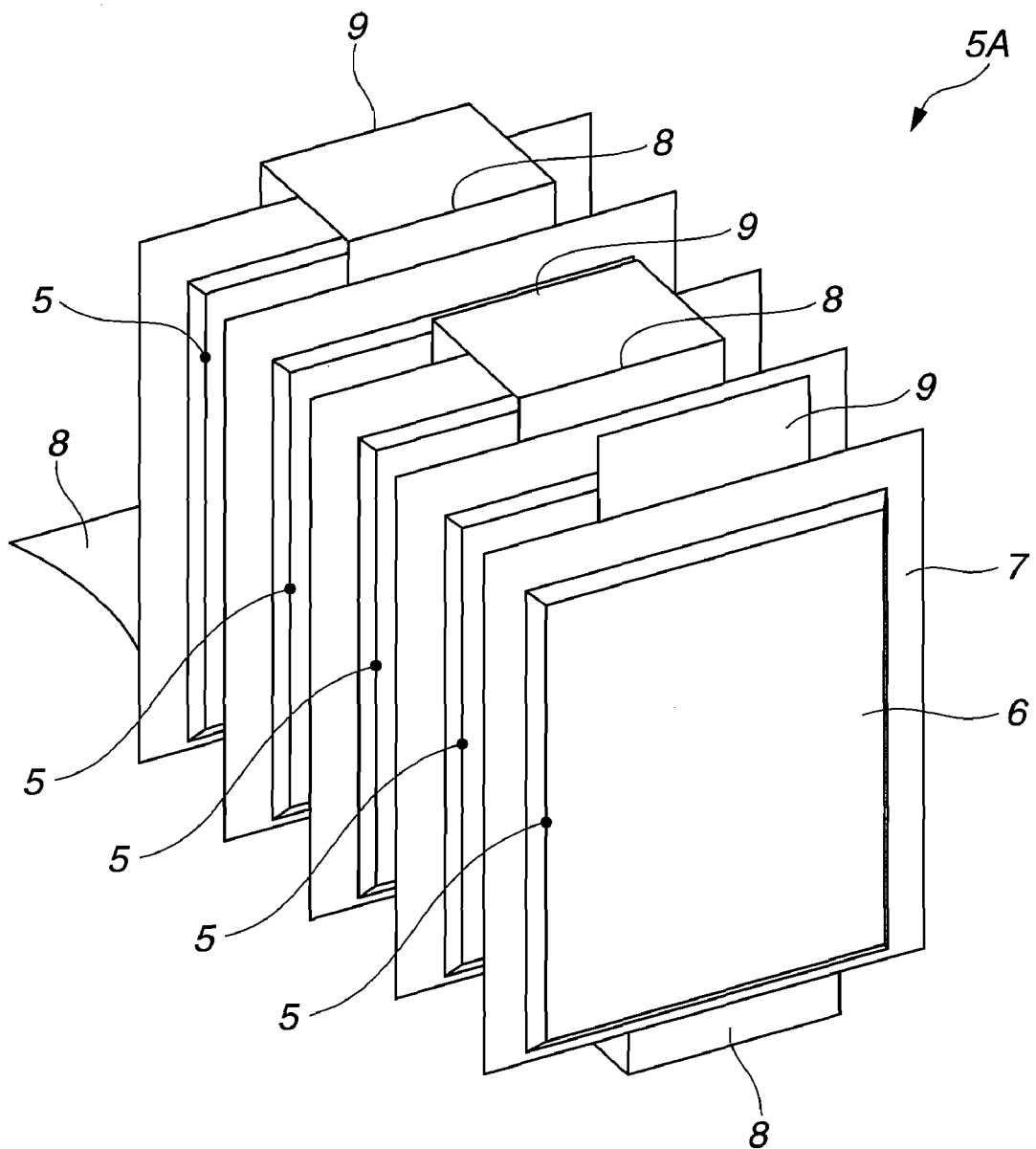
FIG. 2 is a perspective view of electric storage cells connected in series.
Figure 3:
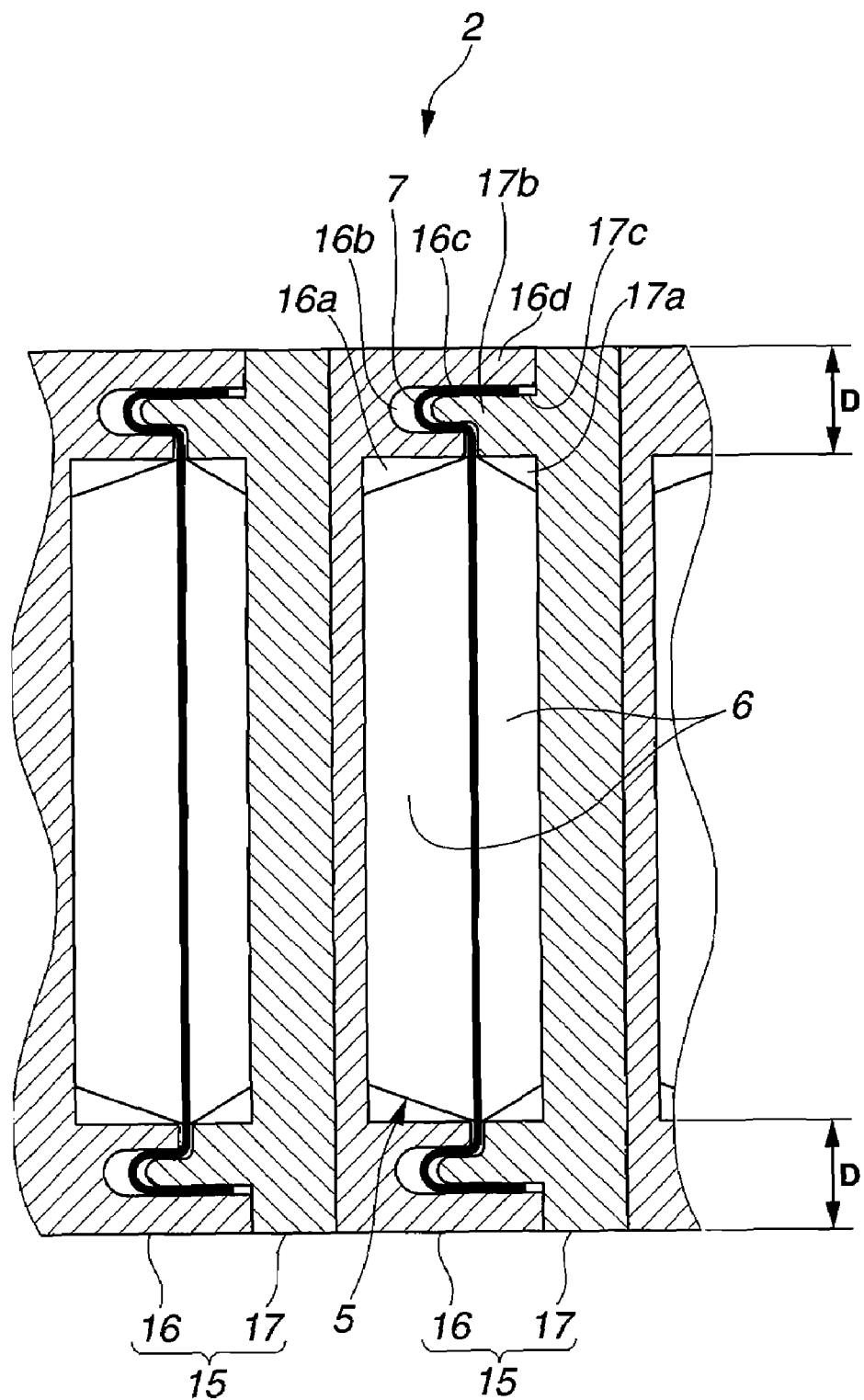
FIG. 3 is a sectional view taken along a line A-A of FIG. 1.
Figure 4:
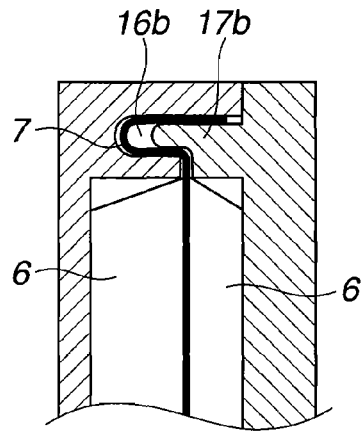
FIG. 4 is diagram showing a clamping state when a sealing portion is longer than a standard size.
Figure 5:
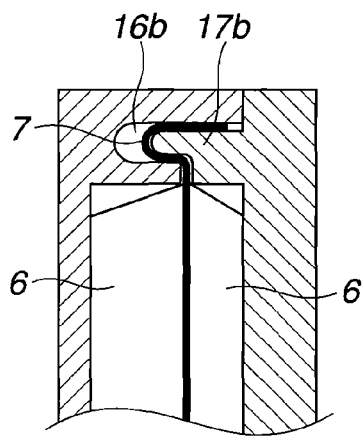
FIG. 5 is diagram showing a clamping state when the sealing portion is shorter than the standard size.
Figure 6:
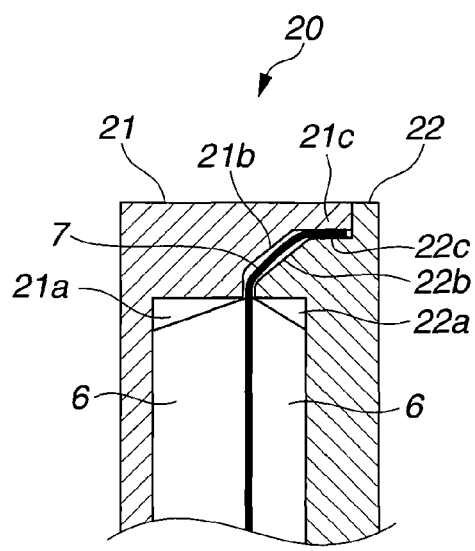
FIG. 6 is a diagram showing another holding structure of the electric storage cell.
Figure 7:
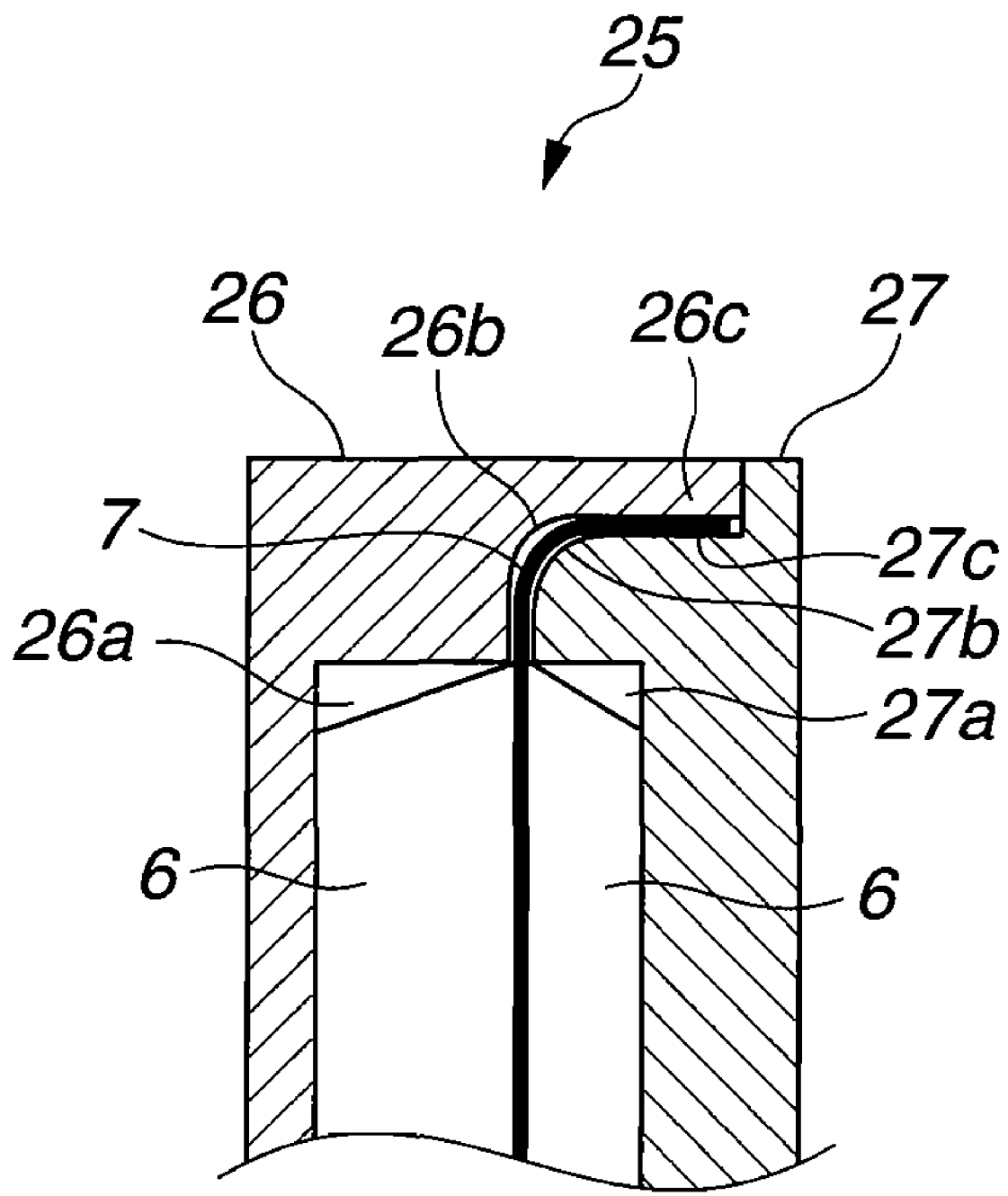
FIG. 7 is a diagram showing still another holding structure of the electric storage cell.

Hereinafter, an embodiment of the present invention will be described with reference to the accompanying drawings. FIGS. 1 to 7 concern the embodiment of the present invention. Here, FIG. 1 is a perspective view of a storage capacitor package; FIG. 2 is a perspective view of electric storage cells connected in series; FIG. 3 is a sectional view taken along a line A-A of FIG. 1; FIG. 4 is diagram showing a clamping state when a sealing portion is longer than a standard size; FIG. 5 is diagram showing a clamping state when the sealing portion is shorter than the standard size; FIG. 6 is a diagram showing another holding structure of the electric storage cell; and FIG. 7 is a diagram showing still another holding structure of the electric storage cell.

In FIG. 1, reference numeral 1 denotes a storage capacitor package used as power source unit, for example, in an electric vehicle (EV) or a hybrid electric vehicle (HEV). This storage capacitor package 1 is mainly composed of a plurality (in the illustrated example, five pieces) of flat electric storage cells 5 (refer to FIG. 2) with a substantially rectangular planar shape, and an external case 2 for accommodating the electric storage cells 5. The external case 2 is constituted, for example, by laminating a plurality (in the illustrated example, five pieces) of cell binders 15 each constituted of a resin-made flat frame body with a substantially rectangular planar shape.

The electric storage cell 5 is a flat storage capacitor having a substantially rectangular planar shape, such as a lithium ion secondary battery or an electric double layer capacitor. As typified by a planar laminate type lithium ion secondary battery, the electric storage cells 5 are ones configured by enclosing and sealing a laminated body of internal electrodes and an electrolytic layer, for example, by a sheet-shaped laminated film formed by insulation-coating the surface of an aluminum-base metal layer with a resin layer.

That is, as shown in FIG. 2, the electric storage cells 5 each include a rectangular-shaped storage portion 6 that embraces a storage element comprising the laminated body of the electrolytic layer and the electrodes, and that is formed somewhat thicker than peripheries; a sealing portion 7 extendedly arranged in a sheet shape around the storage portion 6; and two metal tabs 8 and 9 that serve as positive and negative electrode terminals, respectively, and that are exposed from both ends of the sealing portion 7. In this embodiment, the electric storage cells 5 are serially connected in advance by terminal connections of the tabs 8 and 9. A cell string 5A is formed by these serially connected electric storage cells, and accommodated in the external case 2 in a state of being arranged in a staggered configuration.

Hereinafter, for convenience, the direction in which the tabs 8 and 9 of the electric storage cell 5 are extended is referred to as a longitudinal direction, and the direction orthogonal to the direction in which the tabs 8 and 9 of the electric storage cells 5 are extended is referred to as a lateral direction, as appropriate.

The cell binder 15 comprises a frame body 16 serving as a first frame body and a frame body 17 serving as a second frame body, and the electric storage cell 5 is accommodated between the one set of frame bodies 16 and 17. In such the cell binder 15, the frame body 16 of an arbitrary cell binder 15 and the frame body 17 of the other cell binder 15 abut against each other, and are connected by a fitting structure provided at four corner of the abutting surface.

In one abutting surface of a frame body 17 as shown in FIG. 1, two cylindrical pins 10 are installed in upright positions in the laminating direction, at both corners on the side where the tabs 8 and 9 are extended and exposed. Also, on the other side where the tab 9 of the electric storage cell 5 is extended and exposed, there are provided two holes 11 into which the pins 10 (i.e., the pins 10 of the other cell binder 15) are to be fitted. The pins 10 and the holes 11 are provided also to an abutting surface of the other abutting surface of the frame body 17, while they are not shown. Here, the pins 10 and holes 11 are disposed so that the positional relationship of the pins 10 with the holes 11 becomes reverse between the frame body 17 and the frame body 16.

That is, the pins 10 and the holes 11 of the frame body 17 of a predetermined cell binder 15, respectively, are fitted to the holes 11 and the pins 10 of the frame body 16 of the other cell binder 15, whereby the cell binders 15 are fitted and connected to each other. In this case, a plurality of locking grooves 10a is provided in the outer peripheral surface of each of the pins 10. These locking grooves 10a implement a retaining function with a predetermined strength (so-called a semi-lock structure) between the pin 10 and the hole 11 to be fitted thereto.

The electric storage cell 5 accommodated in the cell binder 15 is held by fitting of the frame bodies 16 and 17 in the laminating direction. The holding structure of the electric storage cell 5 by the frame bodies 16 and 17 constitutes a dual holding structure composed of a structure for clamping the storage portion 6 serving as a cell body being pressed by the frame bodies 16 and 17 in the laminating direction, and a structure for fitting in the pressing direction (laminating direction) of the storage portion 6 in a state where the sealing portion 7 on both lateral sides of the storage portion 6 are bent and the ends thereof are clamped by the frame bodies 16 and 17.

Specifically, as shown in FIG. 3, which is a sectional view taken along the lateral line A-A in FIG. 1, on the side of the frame body 16 to be fitted oppositely to the frame body 17, a substantially rectangular-shaped accommodating portion 16a with a bottom is opened for accommodating one surface side of the storage portion 6 of the electric storage cell 5. On both lateral sides of this accommodating portion 16a, there are provided groove-shaped fitting concave portions 16b each having a predetermined depth in the laminating direction and a length larger than the width in the longitudinal direction of the sealing portion 7. An inner wall (wall portion) 16c on the lateral outside of the fitting concave portion 16b is flush with an inner wall (wall surface portion) of a projecting portion 16d that forms a lateral frame portion of the frame body 16 and that is projected from the opening top surface of the accommodating portion 16a, and as will be described below, this inner wall 16c is set so as to clamp the sealing portion 7 of the electric storage cell 5, in conjunction with the frame body 17.

On the other hand, on the side of the frame body 17 to be fitted oppositely to the frame body 16, a substantially rectangular-shaped accommodating portion 17a with a bottom is opened for accommodating the other surface side of the storage portion 6 of the electric storage cell 5. On both lateral sides of the accommodating portion 17a, there are provided projecting portions 17b each having an elongated shape in the longitudinal direction and a predetermined projection height in the laminating direction. The projecting portion 17b is formed into a substantially arcuate shape in the projection front end thereof. An outer wall (wall portion) 17c on the lateral outside of the projecting portion 17b reaches the substantially flush level with the bottom surface of the accommodating portion 17a, and connected to a step portion against which the front end surface of the projecting portion 16d of the frame body 16 abuts.

As a holding structure for the sealing portion 7 of the electric storage cell 5, the cell binder 15 with the above-described arrangement adopts a structure in which the frame bodies 16 and 17 are fitted to each other while clamping the sealing portion 7 of the electric storage cell 5 between the inner wall 16c on the lateral outside of the fitting concave portion 16b of the frame body 16 and the outer wall 17c on the lateral outside of the projecting portion 17b of the frame body 17. Thereby, the present holding structure constitutes a wall portion that is capable of fitting the frame bodies 16 and 17 to each other in the pressing direction of the storage portion 6 in a state where the ends of the sealing portion 7 of the electric storage cell 5 are clamped. At this time, the holding structure is set so that a gap is formed between the bottom of the fitting concave portion 16b and the front end of the projecting portion 17b. In this gap, the sealing portion 7 of the electric storage cell 5 is accommodated in a state of being deflected by bending.

Also, in a holding structure for the storage portion 6 of the electric storage cell 5, the depth of the each of the accommodating portions 16a and 17a is set so that, when the front end surface of the projecting portion 16d of the frame body 16 abuts against the step portion outside the projecting portion 17b of the frame body 17, the storage portion 6 of the electric storage cell 5 can be pressed/clamped by the bottom of the accommodating portion 16a of the frame body 16 and that of the accommodating portion 17a of the frame body 17. Furthermore, this holding structure is set so that, when the front end surface of the projecting portion 16d of the frame body 16 abuts against the step portion outside the projecting portion 17b of the frame body 17, the side edge of the accommodating portion 16a of the frame body 16 and that of the accommodating portion 17a of the frame body 17 are opposed to each other with a predetermined distance therebetween so as not to press the base portion of the sealing portion 7.

As a result, a lateral dimension D for clamping the sealing portion 7 can be made small as compared with that in a structure in which the sealing portion 7 is planarly clamped, thereby allowing the entire package to be downsized. In addition, providing the sealing portion 7 with deflections allows movements of the electric storage cell 5 to be accommodated when vibrations are applied in the lateral direction (i.e., direction orthogonal to the laminating direction). This eliminates a possibility that the sealing portion 7 will be damaged by a shearing stress, and leads to durability to be improved.

Moreover, by adopting the structure for clamping the sealing portion 7 of the electric storage cell 5 by providing the sealing portion 7 with deflections, it is possible to accommodate a variation in the lateral length of the sealing portion 7 of each individual electric storage cell 5. That is, even if there occurs a dimension error of the sealing portion 7 of the electric storage cell 5 relative to a standard value, there is no need to increase the dimension D of the cell binder 15 in response to the dimension error, but one can address the variation using the cell binder 15 of the unchanged dimension.

For example, as shown in FIG. 4, if the width of the sealing portion 7 of the electric storage cell 5 has a plus error relative to the standard value, then, making longer the bending length of the sealing portion 7 to be accommodated in the gap between the bottom of the fitting concave portion 16b of the frame body 16 and the front end of the projecting portion 17b of the frame body 17 than an ordinary bending length, makes it possible to keep proper the length of the sealing portion 7 to be clamped between the inner wall 16c of the fitting concave portion 16b and the outer wall 17c of the projecting portion 17b, and to avoid malfunctions such as running-over of the sealing portion 7 to the outside by accommodating the plus error.

On the other hand, as shown in FIG. 5, if the width of the sealing portion 7 of the electric storage cell 5 has a minus error relative to the standard value, then, making shorter the bending length of the sealing portion 7 to be accommodated in the gap between the bottom of the fitting concave portion 16b and the front end of the projecting portion 17b than the ordinary bending length, makes it possible to ensure the length of the sealing portion 7 to be clamped between the inner wall 16c of the fitting concave portion 16b and the outer wall 17c of the projecting portion 17b, and to reliably hold the sealing portion 7.

In a structure in which the storage portion 6 and the sealing portion 7 are clamped by mutually different surfaces in the same direction (laminating direction), if the storage portion 6 varies in the thickness, there is a possibility that only one of the storage portion 6 and the sealing portion 7 can be pressed/clamped. However, the holding structure in this embodiment has an independent structure in which the storage portion 6 and the sealing portion 7 are pressed/clamped in mutually different directions, and therefore, even if the storage portion 6 varies in the thickness, it is possible to simultaneously clamp the storage portion 6 and the sealing portion 7, and to ensure a stable characteristic against vibrations during service by accurately providing a bearing stress to the storage portion 6.

Furthermore, the frame bodies 16 and 17 constituting the cell binder 15 have the structure to fit to each other, and hence, when a plurality of cell binders 15 is laminated by accommodating the electric storage cells 5 between the frame bodies 16 and 17, there is no possibility that the cell binders 15 will laterally deviate from each other. As a consequence, the assembling work of the storage capacitor package 1 is improved, thereby allowing productivity to be enhanced.

The above-described holding structure of the electric storage cell 5 can also be made a simplified structure shown in FIG. 6 or FIG. 7. That is, it is possible to form a dual holding structure composed of a structure for clamping the storage portion 6 serving as the cell body in the laminating direction as in the case of the cell binder 15, and a structure for clamping the sealing portion 7 in the direction substantially orthogonal to the laminating direction by bending the sealing portion 7.

A cell binder 20 shown in FIG. 6 is fundamentally the same as the cell binder 15 in the holding structure of the electric storage cell 5, but the cell binder 20 is low in the bending amount of the sealing portion 7 compared with the cell binder 15. The cell binder 20 comprises a frame body 21 serving as a first frame body that is made more shallow in the fitting concave portion 16b of the frame body 16, and a frame body 22 serving as a second frame body, the frame body 22 being to be fitted to the frame body 21.

That is, the frame body 21 includes a substantially rectangular-shaped accommodating portion 21a with a bottom for accommodating one surface side of the storage portion 6 of the electric storage cell 5; taper-shaped guide portions 21b that are provided on both sides of the accommodating portion 21a and that are diverged from the opening top surface of the accommodating portion 21a toward the laminating direction; and a side wall portion (wall surface portion) 21c that is projected from the guide portion 21b toward the laminating direction to thereby form a lateral frame portion of the frame body 21. On the other hand, the frame body 22 includes a substantially rectangular-shaped accommodating portion 22a with a bottom for accommodating the other surface side of the storage portion 6 of the electric storage cell 5; taper-shaped guide portions 21b that are provided on both sides of the accommodating portion 22a and that are oppositely arranged so as to form a predetermined gap with respect to the guide portion 21b of the frame body 21; and a side wall portion (wall surface portion) 22c formed on the lateral outside of the guide portion 22b.

The cell binder 20 accommodates the storage portion 6 of the electric storage cell 5 in the accommodating portion 21a of the frame body 21 and the accommodating portion 22a of the frame body 22, and further accommodates the sealing portion 7 of the electric storage cell 5 in a gap between the guide portion 22b of the frame body 21 and the guide portion 22b of the frame body 22, in a state of being provided with deflections by bending in the laminating direction. The ends of the sealing portion 7 are each clamped between the inner wall surface of the side wall portion 21c of the frame body 21 and the outer wall surface of the side wall portion 22c of the frame body 22, thereby fitting the frame bodies 21 and 22 to each other.

Compared with the case of the cell binder 20 in FIG. 6, in a cell binder 25 shown in FIG. 7, the area for accommodating the sealing portion 7 of the electric storage cell 5 is arcuately shaped. In the cell binder 25, the guide portions 21b and 22b are each arcuately shaped. The cell binder 25 accommodates the storage portion 6 of the electric storage cell 5 in an accommodating portion 26$a$ of a frame body 26 serving as a first frame body, and an accommodating portion 27$a$ of a frame body 27 serving as a second frame body, and further accommodates the sealing portion 7 of the electric storage cell 5 in a gap formed between an arcuate guide portion 26$b$ of the frame body 26 and an arcuate guide portion 27$b$ of the frame body 27, in a state of being provided with deflections by being arcuately bent in the laminating direction. The ends of the sealing portion 7 are each clamped between the inner wall surface of a side wall portion (wall surface portion) 26$c$ of the frame body 26 and the outer wall surface of a side wall portion (wall surface portion) 27$c$ of the frame body 27, thereby fitting the frame bodies 26 and 27 to each other.

In these cell binders 20 and 25, the bending amount of the sealing portion 7 of the electric storage cell 5 is low. Therefore, as compared with the cell binder 15, the cell binders 20 and 25 are somewhat small in the degree of tolerance for dimension error of the sealing portion 7, but can reduce the load upon the sealing portion 7.

As described above, the package structure of electric storage cells according to this embodiment is not a structure in which the storage portion 6 of the electric storage cell 5 and the sealing portion 7 are planarly pressed/clamped in the same direction (laminating direction), but a structure in which the storage portion 6 is pressed/clamped in the laminating direction, and in which the ends of the sealing portion 7 are each pressed/clamped by the wall surfaces in the direction substantially orthogonal to the laminating direction in a state where the sealing portion 7 is provided with deflections. This makes it possible to increase the shock resistance of the electric storage cells 5 while downsizing the package.

The invention claimed is:

1. A package structure of planar-shaped electric storage cells, the package structure being packaged by accommodating the planar-shaped electric storage cells, each of which has a storage portion and a sealing portion that seals the storage portion and is extendedly arranged around the storage portion, in frame bodies that are pressed together to surround the storage portion, the package structure comprising:
   a first frame body for pressing the storage portion of one of the planar-shaped electric storage cells from one surface side thereof;
   a second frame body opposed to the first frame body for pressing the one storage portion from the other side thereof; and
   a holding structure provided between first wall surface portions of the first frame body and the second frame body, the holding structure being configured for accommodating the sealing portion in a deflected state and extending in the pressing direction of the frame bodies in a state where the ends of the sealing portion are clamped.

2. The package structure of electric storage cells according to claim 1, wherein the holding structure comprises a gap for accommodating a portion of the sealing portion in a bent state, and the first wall surface portions extend in the pressing direction of the frame bodies in a state where the ends of the sealing portion are clamped.

3. The package structure of electric storage cells according to claim 1, wherein second wall portions of the first frame body and the second frame body are arcuately-shaped and define the gap.

4. The package structure of electric storage cells according to claim 1, wherein second wall portions of the first frame body and the second frame body extend at an acute angle to the pressing direction of the frame bodies and define the gap.

5. The package structure of electric storage cells according to claim 1, wherein the sealing portion of each electric storage cell is integrated with and extends laterally away from the storage portion.

* * * * *